United States Patent [19]

Bailey et al.

[11] Patent Number: 4,869,813
[45] Date of Patent: Sep. 26, 1989

[54] DRILL INSPECTION AND SORTING METHOD AND APPARATUS

[75] Inventors: Mark L. Bailey, Redondo Beach; Horst W. Neu; Deanna C. Silverman, both of Torrance, all of Calif.

[73] Assignee: Northrop Corporation, Hawthorne, Calif.

[21] Appl. No.: 69,339

[22] Filed: Jul. 2, 1987

[51] Int. Cl.⁴ .................... B07C 5/36; G05B 19/02
[52] U.S. Cl. .................... 209/538; 209/548; 209/556; 209/564; 209/586; 209/587; 209/706; 209/903; 209/925; 209/933; 209/939; 364/478; 364/579; 364/580; 901/9; 901/47
[58] Field of Search ............ 209/538, 509, 548, 549, 209/552, 555, 556, 558, 563, 564, 576, 577, 586, 587, 617, 706, 903, 925, 933, 939, 942; 356/69; 358/106, 107, 903; 364/478, 506, 507, 513, 579, 580; 414/226, 273, 277, 278, 280–283; 901/6, 9, 17, 46, 47

[56] References Cited

U.S. PATENT DOCUMENTS

| | | | |
|---|---|---|---|
| 2,464,449 | 3/1949 | Johnston | 209/625 |
| 2,794,551 | 6/1957 | Colling et al. | 209/676 |
| 2,902,152 | 9/1959 | Wilkes | 209/549 |
| 2,982,405 | 5/1961 | Fitzgerald | 209/933 X |
| 3,322,273 | 5/1967 | Bailey | 209/933 X |
| 3,951,271 | 4/1976 | Mette | 901/46 X |
| 4,380,295 | 4/1983 | Soderberg et al. | 209/598 X |
| 4,587,617 | 5/1986 | Barker et al. | 364/507 |
| 4,593,820 | 6/1986 | Antonie et al. | 364/579 X |
| 4,690,283 | 9/1987 | Carrell | 209/706 X |
| 4,700,224 | 10/1987 | Miyasaka et al. | 358/107 X |

FOREIGN PATENT DOCUMENTS

| | | | |
|---|---|---|---|
| 2916702 | 10/1979 | Fed. Rep. of Germany | 901/17 |
| 3022173 | 12/1981 | Fed. Rep. of Germany | 901/9 |
| 3335603 | 4/1984 | Fed. Rep. of Germany | 901/9 |
| 2112130 | 7/1983 | United Kingdom | 209/939 |

*Primary Examiner*—Johnny D. Cherry
*Assistant Examiner*—Edward M. Wacyra
*Attorney, Agent, or Firm*—Terry J. Anderson; Robert B. Block

[57] ABSTRACT

Apparatus for inspecting and sorting drills oriented in the same direction in a hopper assembly. The hopper assembly feeds the drills, one at a time, and places them in a predetermined ready location. A camera, part of the inspection assembly, mounted directly over the predetermined ready location, takes preliminary measurements and alerts the system controller that a drill is available for a high resolution second inspection for wear and then for sorting. A robot assembly then picks up the drill from the ready location and orients it in front of two high resolution cameras, also part of the inspection assembly, for a visual inspection for wear. A control assembly then analyzes the results of the inspection and determines the drill size and whether or not it needs to be re-ground. The robot assembly then sorts the drill into an appropriate predetermined bin within a bin assembly as a function of size and wear. The process is then repeated. The hopper assembly is reloaded when it is empty and the bins are emptied when full. The disclosure also includes the method of inspecting and sorting drills as carried out by the apparatus as described above.

20 Claims, 5 Drawing Sheets

DRILL INSPECTION AND SORTING METHOD AND APPARATUS

BACKGROUND OF THE INVENTION

1. Field of the Invention

This invention relates to a method of handling cylindrical objects and, more particularly, to a method of feeding, inspecting, and sorting drills. This invention also relates to apparatus for performing such methods.

2. Description of the Prior Art

Large machine shops and air frame manufacturers are required to re-grind thousands of drills each day as a result of wear on drills resulting from normal use. The importance of re-grinding drills for quality point geometries is well known. An efficient program for maintaining well ground drills can improve the through-put capacity of the machine shop, reduce labor requirements, increase the lives of the drills, reduce hole rework, improve the quality of the drilled holes, and improve the fatigue life of the products in which the holes are made. An efficient program can also reduce the grind shop load and thus extend the lives of the grinding machines. Without an efficient drill evaluation system, there is typically a needless re-grinding of drills which are not worn, an artificial backlog of drills, and added wear on the drill grinders which results in inconsistent and inaccurate drills significantly affecting rework costs and the quantity of the products.

It must be realized that it is not sufficient to merely send drills to re-grind on a periodic time or use basis since drills are normally sent from the production line, not only because of wear from normal usage over a period of time, but frequently because of chip and sealant clogging as well as for other non-wear related failures.

Many techniques exist for the implementation of the feeding, inspection, and sorting of cylindrical objects, such as drills for a re-grind program, and many techniques have been attempted in the past. Prior patent disclosures illustrate such techniques and document the development of this technology to the highly developed state that it enjoys today. For example, U.S. Pat. Nos. 2,502,503 to Berkley; 3,025,747 to Casselman, et al; and 3,405,578 to Persson all involve merely one-dimensional vision detecting of the sharpness of edges on razors, knives, and the like. More specifically, the patent to Berkley shows an apparatus employing optical means for testing the sharpness of objects such as razor blades. An oscilloscope provides the readout. Electronic circuitry may automatically reject blades found to be dull beyond certain tolerance limits. The patents to Casselman, et al and to Persson also teach optical means for determining the sharpness of linear cutting edges.

Patents directed to the movement of parts include U.S. Pat. Nos. 3,200,964 to Eldred; 3,730,364 to Nakamura et al; and 3,841,499 to Bullard. More specifically, the patent to Nakamura et al teaches a device having a manipulator for selecting samples for analysis and sequentially placing the samples into appropriate receptacles. The other two patents do not involve the vision inspection and sorting of parts Vision applications can also be found in the patent literature. U.S. Pat. No. 4,420,253 to Pryor shows an optical means for detecting wear or breakage of a tool which could be a drill. This process uses fiber optics which are internal to the tool except in the instance of a worn or broken tool. The wear detecting means is connected through a microprocessor to a robot tool changing means. U.S. Pat. No. 4,344,146 to Davis et al does not employ plural cameras to determine drill type and wear.

U.S. Pat. Nos. 4,359,815 to Toyoda and 4,402,053 to Kelley et al disclose the use of robots as parts of systems. The patent to Toyoda shows the use of a robot manipulator arm to carry out tool exchanging and machining operations on a workpiece and workpiece manipulation in sequence with the two operations not interfering with each other. Used tools are placed in moving storage magazines. The patent to Kelley et al uses optical means combined with a robot manipulator arm to measure and determine the orientation of a workpiece.

Systems involving a part presentation, inspection, and sorting application are disclosed in U.S. Pat. No. 4,457,622 to Kato et al; Canadian Pat. No. 961803 to Bornemeier; and in U.S. Pat. No. 4,527,326 to Kohno et al. The patent to Kato et al shows a screw inspection device comprising a feed supply, transfer means, a plurality of optical sensors including laser light sources and signal processing means whereby a threaded fastener such as a screw or bolt can be measured against predetermined tolerances for length, diameter, and the presence and angle of threads. Items not within the preset tolerances can be rejected from the stream of parts. This patent does contact inspection on screws. The Canadian Patent shows an optical inspection and classifying means for determining the physical characteristics of a moving item such as a threaded fastener Items outside the tolerance limits are transferred out of the parts stream. The patent to Kohno et al shows an optical sorting system comprising a sorting device, an image detecting device such as a television camera, and an image processor connected to a robot manipulator arm. The presence of parts within specifications causes the manipulator arm to transfer the parts to another point in the system. This patent has a parts hopper with random parts, a robot, a vision system, and a sorting application. This is a general system and applies to assembly parts.

As is illustrated by the great number of prior patents, efforts are continuously being made in an attempt to solve the problem of feeding, inspecting, and sorting cylindrical objects such as drills. None of these patents, however, discloses or suggests the present inventive combination of elements and method steps for reliably, conveniently, accurately, rapidly, and economically feeding, inspecting, and sorting drills as disclosed herein. The present invention achieves its purposes, objectives, and advantages over the prior art through new, useful, and unobvious elements, with a minimum number of functioning parts, at a reduction of cost, and through the utilization of only readily available materials and conventional components.

These objects and advantages should be construed as merely illustrative of some of the more prominent features and applications of the present invention. Many other beneficial results can be obtained by applying the disclosed invention in a different manner or by modifying the invention within the scope of the disclosure. Accordingly, other objects and advantages as well as a fuller understanding of the invention may be had by referring to the summary of the invention and detailed description describing the preferred embodiment of the invention in addition to the scope of the invention as defined by the claims taken in conjunction with the accompanying drawings

SUMMARY OF THE INVENTION

The present invention is defined by the appended claims with the specific preferred embodiment shown in the attached drawings. For the purposes of summarizing the invention, the invention may be incorporated into a method of inspecting and sorting drills from a supply of drills. The method comprises the steps of operatively positioning a robot with respect to a horizontal work plane with a center point located at a predetermined reference location. The robot has an arm moveable with respect to a vertical axis extending through the center point of the work plane, the arm having gripper fingers on the end thereof remote from the axis. The method also comprises the steps of operatively positioning a plurality of bins in an array with respect to the axis and working plane of the robot and operatively positioning a supply of drills to be inspected and sorted in a drill hopper adjacent to the robot and the bins The drills, irrespective of size, are fed one at a time from the hopper to sequentially position each drill at a predetermined position with respect to the work plane and the axis for inspection and transportation to a particular one of the plurality of bins. The drills are then visually inspected and the robot is programmed for transporting the inspected drill to a particular one of the plurality of bins as a function of the inspection. Lastly, the drills are transported by the fingers of the robot to the particular one of the plurality of bins as a function of the programming.

The inspection is accomplished optically. This inspection includes visual inspection with a first camera to determine the size of the drill followed by visual inspection at a second station to determine the wear of the drill. The first visual inspection establishes the parameters for the second visual inspection. The second visual inspection establishes the parameters for the robot for the transporting of the drill to a predetermined bin as a function of the established parameters of the robot. The bins are positioned in an arcuate array around the vertical axis and the transporting is effected through the fingers of the robot moving in an arc around the vertical axis The invention may also be incorporated into apparatus for inspecting and sorting cylindrical objects, one at a time, from a supply of cylindrical objects. The apparatus comprises a horizontal work plane with a center point located at a predetermined reference location and a robot operatively positioned with respect to the work plane, the robot having an arm rotatable about a vertical axis extending through the center point of the work surface, the arm having gripper fingers on the end thereof remote from the axis. The apparatus also includes a drive assembly having a first drive means to rotate the fingers about the axis, a second drive means to raise and lower the fingers with respect to the axis, a third drive means to oscillate the fingers of the arm inwardly and outwardly along a radius extending through the axis, fourth drive means to move the fingers with respect to the arm, and fifth drive means to activate and inactivate the fingers between an object gripping orientation and an object releasing orientation. The apparatus also includes a plurality of bins operatively positioned in a plurality of planes perpendicular with respect to the axis and at a plurality of distances from the work plane, the bins also being operatively positioned arcuately around the axis. A hopper is also included and is adapted to receive and support a supply of cylindrical objects to be fed, inspected and sorted. Means are associated with the hopper to feed cylindrical objects from the hopper, one at a time, and to sequentially position each cylindrical object at a predetermined position with respect to the work plane and the axis for inspection and transportation to a particular one of the plurality of bins. Also included as part of the apparatus are inspection means positioned in operative proximity to the predetermined position to inspect the positioned cylindrical object and to program the drive assembly for transporting the inspected cylindrical object to a particular one of the plurality of bins as a function of the inspection. Lastly, the apparatus includes means responsive to the inspection of each cylindrical object and the programming of the drive assembly to activate the drive assembly for transporting the inspected cylindrical object by the fingers to the particular one of the plurality of bins.

The inspection means includes a first sensor means for determining the size of the inspected cylindrical object and a second sensor means for determining the wear on the inspected cylindrical object. The first sensor means preconditions the second sensor means. The apparatus includes a third sensor means to sense the condition of a bin prior to depositing a transported cylindrical object into the sensed bin. The third inspection means will inactivate the drive assembly if the sensed bin is absent or full.

The invention may further be incorporated into a system for feeding, inspecting and sorting drills from a supply of drills. The system comprises a work plane with a center point located at a predetermined reference location and a robot operatively positioned with respect to the work plane, the robot assembly having an arm movable with respect to an axis extending perpendicularly through the center point of the work plane, the arm having gripper fingers on the end thereof remote from the axis. The system also includes a drive assembly having means to move the fingers circumferentially with respect to the axis and to move the fingers parallel with respect to the axis and to oscillate the fingers inwardly and outwardly along a radius extending through the axis and to move the fingers with respect to the arm and to activate and inactivate the fingers between a gripping orientation and a releasing orientation. The system also includes a plurality of bins operatively positioned with respect to the robot and the axis, the bins also being operatively positioned in a plurality of planes perpendicular with respect to the axis and at a plurality of distances from the work plane. Also included in the system is a drill hopper operatively positioned with respect to the robot and the bins and adapted to receive and support a supply of drills to be fed, inspected, and sorted, one at a time, and to sequentially position each drill at a predetermined position with respect to the work plane and the axis for inspection and transportation to a particular one of the plurality of bins. The system also includes a visual inspection means positioned in operative proximity to the predetermined position to inspect the positioned drill and to program the drive assembly for transporting the inspected drill to a particular one of the plurality of bins as a function of the inspection. Lastly, the system includes means responsive to the inspection of each drill and the programming of the drive assembly to activate the drive assembly for transporting the inspected drill by the fingers to the particular one of the plurality of bins.

The system further includes digital control means operatively associated with the visual inspection means for comparing the output of the visual inspection means resulting from the inspection of the positioned drill against a predetermined standard. The visual inspection means includes a first sensor means to determine the size of the positioned drill and a second sensor means programmed in response to the output of the first sensor means to determine wear on and geometry of the positioned drill. The positioned drill is inspected a first time by the second sensor means, then rotated 180 degrees and inspected a second time. The second sensor means inspects for a plurality of wear factors. The output of the second sensor means controls the drive assembly. The system output of the second sensor means determines the acceptability or rejectability of a drill as a result of the comparison and then the fingers transport the inspected drill to a bin as a function of the acceptability or rejectability as well as the size thereof. The system further includes an optical detector associated with the arm to determine the condition of the particular one of the plurality of bins. The system further includes means to inactivate the drive assembly if the particular one of the plurality of bins is absent or full.

BRIEF DESCRIPTION OF THE DRAWINGS

For a more complete understanding of the nature, objects, and advantages of the present invention, reference should be had to the following detailed description taken in conjunction with the accompanying drawings in which.

Similar reference numerals refer to similar parts throughout the several drawings

DETAILED DESCRIPTION OF THE INVENTION

Overview

Figure 1:
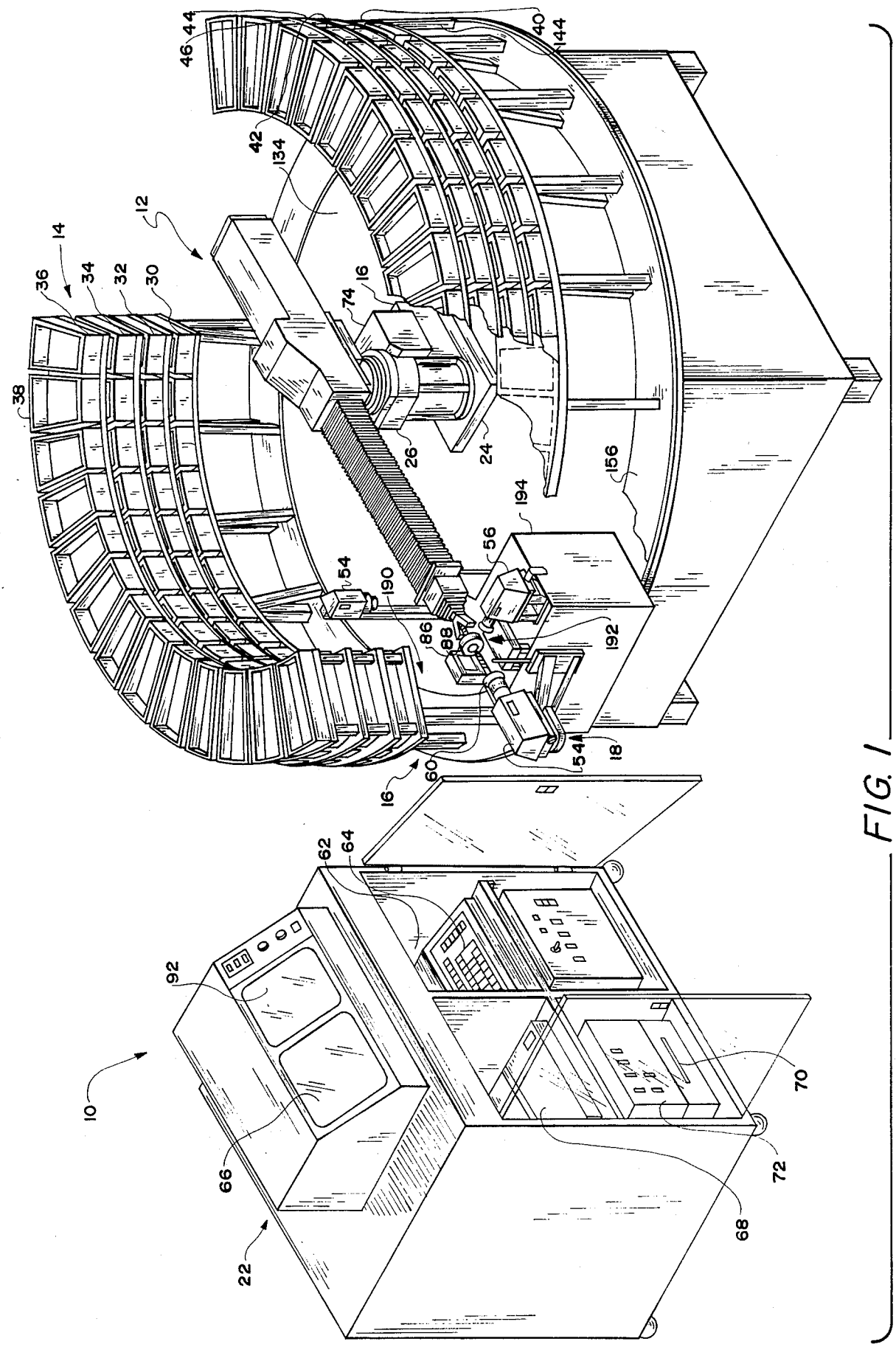
FIG. 1 is a perspective illustration of the drill inspecting and sorting system constructed in accordance with the teachings of the present invention.
Figure 2:
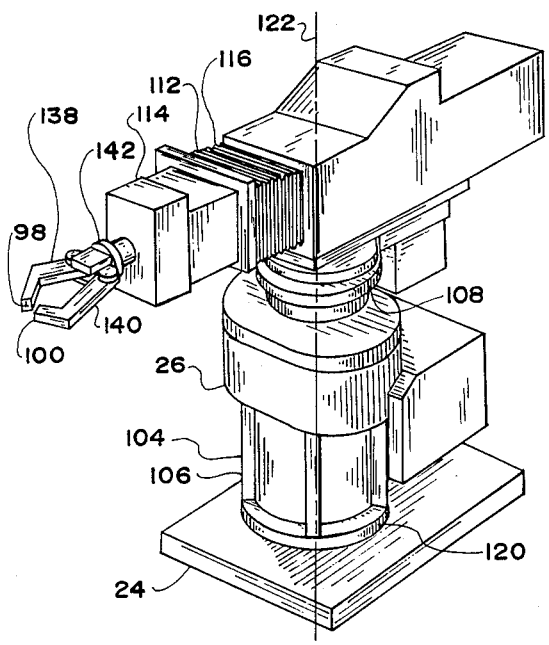
FIG. 2 is a perspective illustration of the robot assembly shown in FIG. 1.

The drill inspection and sorting system 10 of the present invention represents a new state-of-the-art in tooling inspection and sorting which utilizes an array of assemblies, all under a centralized computer control hierarchy. This array of assemblies include the robot assembly 12, the bin assembly 14, the hopper assembly 16, the inspection assembly 18, and the control assembly 22.

The robot assembly 12 includes a support table 24 and a fast, accurate, multi-axis, rotary gripper robot 26 with extended rotational capabilities and having the capabilities for horizontal and vertical strokes The robot is utilized to retrieve drills 28 from the hopper assembly 16, present the retrieved drills to the inspection assembly 18, and then deliver the inspected drills to an appropriate sorting bin 30 of the bin assembly 14 as a function of the inspection. The robot assembly 12 is at the center of the system 10 and represents a central element of the system.

The bin assembly 14 essentially surrounds the robot assembly 12 and is used to position a plurality of sorting bins 30, 32, 34, 36, 38 in a plurality of arcuate tiers 40, 42, 44, 46 to provide mounting positions for receiving the inspected drills 28 from the hopper assembly 16 and inspection assembly 18 through the robot assembly 12. Its rigid tubular construction and small size provide an ideal production component requiring minimal floor space The drill hopper assembly 16 provides a means to support and retain the quantity of unsorted drills 48 to be fed, inspected, and sorted, and to present unsorted drills, one at a time, from a wide variety of sizes to a ready location 50 for retrieval by the robot assembly. Each drill is inspected for size and wear and then distributed by the robot assembly to a predetermined bin of the bin assembly as a function of the inspection.

The inspection assembly 18 provides highly accurate measurements of drill size, geometry, and conditions through a three camera inspection system. The inspection controls are responsible for functioning with the inspection hardware, i.e., an overhead, coarse diameter measurement camera 54; a high resolution side view inspection camera 56; and a high resolution end view camera 58 with a power zoom lens 60. All of the inspection hardware is operable under the control of the control assembly 22. The optical inspection assembly creates a digital output of the cameras and compares it with a predetermined digital reference standard within the control assembly to determine whether the inspected drill may be returned to the production line, i.e., is acceptable, or whether the inspected drill must first be re-ground, i.e., is rejectable. The inspection assembly signals and programs the robot 26 for transporting the inspected drill 28 to an appropriate bin 30 of the bin assembly 14 as a result of the inspection and comparison.

The control assembly 22 for the system 10 includes a group of interrelated electrical subassemblies, components and elements for operating the controlled assemblies as described above. The controlled assemblies are the robot assembly 12, the bin assembly 14, the hopper assembly 16, and the inspection assembly 18. The elements of the control assembly 22 include the host computer 62 for providing overall logic to the remainder of the control assembly as well as to the system. Associated with the host computer is a keyboard interface 64 for resetting drill parameters and the like, a cathode ray tube (CRT) 66 for informing the operator of the status of the control assembly and any problems within the system, a printer 68 for providing a hard copy output of any information relating to the control assembly such as an overview of the day's production or the like, a floppy disc 70 for providing software backup such as optical comparison, standards, parameters, or acceptable tolerance variations and for the digital input processor (DIP) 72 for the real time operation and control of the system. The DIP, in turn, controls further subassemblies, components and elements of the control assembly including the robot assembly controller 74 along with its keyboard 76 located adjacent the robot 26, the hopper assembly controller 78, the cameras 54, 56, 58 and lights 84, 86, 88 of the inspection assembly controller 90, and a video monitor 92 for operator viewing of that which the cameras are viewing.

Robot Assembly

Figure 3:
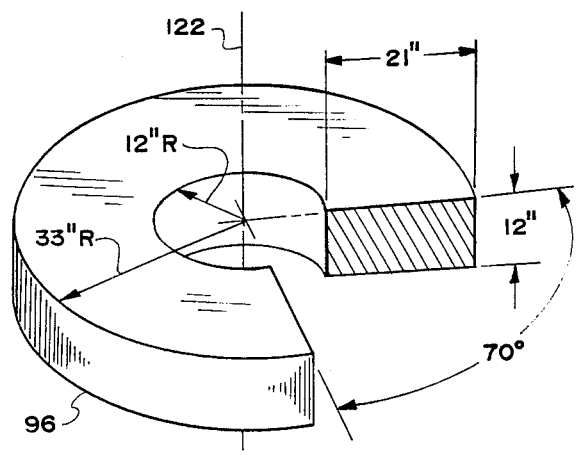
FIG. 3 is a schematic illustration showing the field of movement of the fingers of the arm of the robot assembly of FIGS. 1 and 2.

The drill inspection and sorting system 10 utilizes a precision, point-to-point, D.C. servo, simultaneous multi-axis robot 26. This unit is utilized due to its cost, work envelope 96, accuracy and speed. FIG. 3 represents a pictorial illustration of the sorting manipulator work envelope 96, i.e., the area of travel of the fingers 98, 100 of the robot.

The robot includes a prepositioned fixed base or table 24 with a vertical support post 104 extending upwardly therefrom. The post is provided with two telescoping sections 106, 108 to allow the upper section of the post 108, along with the robot fingers 98, 100 to effectively extend and move vertically with respect to the lower section 106 of the post 104. A motor or motion imparting drive 110 is associated therewith. The upper end of the upper post is provided with a robot arm 112 having an outward section 114 and an inward section 116 also coupled in a telescoping fashion to allow for a variable horizontal reach of the robot arm. A motion imparting drive or mechanism 118 is associated with the arm. The post is also provided at its lower end with a bearing assembly 120 to allow for the oscillation of the post and also the arm and fingers around the vertical axis 122 of the robot. A motion imparting drive 126 is provided to effect the rotary motion of the post and arm. Located at the outboard end of the arm, the end remote from the post and the axis, are a pair of grippers or gripper fingers 98, 100 adapted for motion between a gripping orientation and a releasing orientation for the gripping and releasing of a workpiece 28 such as the drills to be inspected and sorted. Motion imparting drives 128 are provided to effect this motion of the gripper fingers.

Motion imparting drives 130 are also provided for effecting a full 180 degree rotation, in either direction, of the fingers concurrently about their axis which is the axis of the arm. The normal axis of the fingers is concentric with the axis of the arm, but the axis of the fingers is movable through motion imparting mechanisms 132 to 90 degrees from the axis of the arm. This allows for full movement of the fingers with respect to the arm.

The preferred robot for the inspection and sorting system of the present invention is the Sieko Electric Robot Model 5000. The literature relating to such robot is incorporated by reference herein.

The robot is supported on a table 24 which elevates the robot off the floor 134 for proper and precise locating or positioning of the robot and its fingers with respect to the other assemblies of the system. The floor 134 constitutes the reference surface or reference plane for locating the remainder of the components of the system in the vertical direction. The vertical center of the robot is it axis of rotation and extends perpendicularly through the reference plane, the floor, at the center point of the reference plane. The center point and the axis constitute a reference point and a reference line, respectively, for proper locating or positioning of the robot 26 and its fingers 98, 100 rotationally and horizontally with respect to the other components of the system 10.

Figure 4:
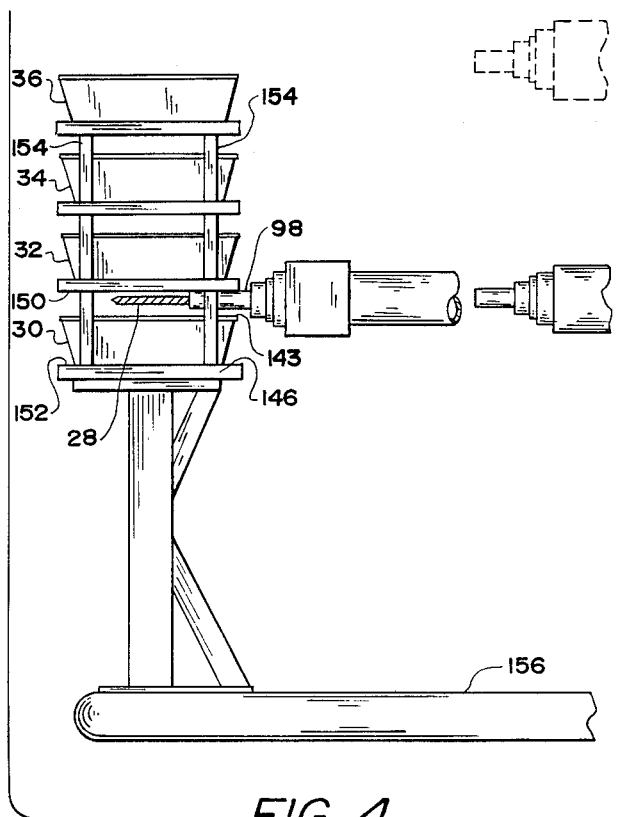
FIG. 4 is an enlarged perspective illustration showing some of the bins of the bin assembly illustration in FIG. 1 and showing the robot fingers and supported drill in both an extended and retracted orientation.

In the disclosed preferred embodiment, the horizontal reach of the fingers is 33 inch (83.82 centimeter) maximum from the robot axis of rotation and 12 inch (30.48 centimeter) minimum thereby providing a 21 inch (53.34 centimeter) stroke. The measurement point is the center point of the fingers or grippers as seen from above with the fingers mounted in a vertical mode. Actual mounting of the end fingers for the sorting system application will place the fingers on the end of the robot arm, in a horizontal mode as shown in FIGS. 1 and 4. Arm rotation comprises a minimum of 290 degrees. Vertical travel is 12 inches (30.48 centimeters). These capabilities result in an envelope of movement for the fingers dimensioned as shown in FIG. 3.

The grippers or gripper fingers are formed of a "V" block 138, 140, of the two finger type, mounted on the end of the robot arm in the horizontal position. It may be magnetically or pneumatically, but preferably electronically, actuated. The "V" blocks are approximately 1 inch (2.54 centimeters) long and capable of holding drills from 0.098 to 0.500 inches (0.25 centimeters to 1.27 centimeters) without slipping. Functionally, the gripper retrieves drills by the shank end from the drill hopper with the fingers open vertically, holds the drill during optical inspection, and drops the inspected drill into a sorting bin with fingers open horizontally slipping between stories in the sorting tower.

The gripper wrist 142 provides 180 degree rotation in either direction with high accuracy to position the gripper jaws, or "V" blocks vertically for drill pick-up at the hopper to position the jaws horizontally to drop drills into sorting bins and, also importantly, to rotate the drill 180 degrees at the second inspection position to verify symmetry and straightness of each drill.

The various motion imparting drives 110, 118, 126, 128, 130, 132 of the robot ar contained within the robot. Located therebeneath is the robot controller 74 for appropriately activating the various drives of the robot. During operation and use, electrical signals from the digital input processor 72 control the robot controller 74 which, in turn, controls the robot drives. A robot controller keyboard 76 is positioned operatively in association with the robot controller to modify the robot controller so as to permit an operator to modify, expand or contract, the mechanical capabilities of the robot in response to commands from its controller as may be desired for transporting drills from the hopper and inspection stations to an appropriate bin.

Bin Assembly

The sorting bin tower structure 144 is arranged radially about the axis 122 of the robot 26 and comprises, in the preferred embodiment, four tiers 40, 42, 44, 46 with 26 bins in each tier to accommodate a number of drill sizes. This number is, however, variable with the number of drill sizes to be inspected. Due to the limited vertical travel of the robot, as 12 inches (30.48 centimeters), it is imperative that the tier support structure 146 be so configured to maximize the space between the top of each bin 148 and the underside 150 of the tier above. Attention to this detail assures adequate space for entry of the gripper fingers 98, 100 above each bin and adequate vertical travel of the robot to address all four tiers of bins. Each tier is routed to form a pocket for each bin to maximize clearance.

Sorting bins are approximately 2.75 inches high (6.98 centimeters), 8.75 inches (22.23 centimeters) long, and 5.00 inches (12.70 centimeters) wide. The bottom surface of each bin is approximately 7.50 inches (19.05 centimeters) long and 3.50 inches (8.89 centimeters) wide.

The top surface 148 of the bottom tier bin is placed at a height above the support table 152 mounting surface to assure that the 12 inch (30.48 centimeter) vertical travel of the robot will allow drill loading to all four tiers. The space between the top of the first tier bin to table top is approximately 20 inches (50.80 centimeters). The bin tower support structure 146 is formed of wall mild steel or aluminum tubing with support gussets and large surface mounting plates. Wood or plastic, but preferably formed sheet metal, is used as tier material. Regardless of the material selection, it must be considered that on each of the two four-tiered structures, up to 1,000 pounds must be supported. Care should be taken to assure that none of the support structures will interfere with the sorting robot 26.

The tiers are supported or stacked on multiple tubes 154 attached to each tier by counterbored Allen head type hardware. A minimum of two tubes are placed between each bin for tier support The bins are all located within the field of movement 96 of the fingers on the arm of the robot. This field of movement is shown in FIG. 3. The bins are well located within the field of movement of the fingers and, therefore, accommodate the full usage of the robot in feeding the inspected drills to all of the bins.

A rigid tubular supported table 156 is provided for mounting the sorting bin tower 144, and optical inspection assembly 18. Reinforcements, either plate or tubular, are incorporated to assure rigid robot mounting. The table top itself is of a minimum supporting thickness and coated or laminated with resilient surfaces. All four sides of the structure are enclosed with heavy gauge sheet metal. Large double access doors are placed on the front or inspection system side of the enclosure. A second access door is placed on the opposite side. If the under table enclosure is utilized for housing any control components, such as transformers, or the like, it should be sealed. Floor lagging provisions are also preferably included.

A provision is made to prevent drill sorting if the required bin is not present or if the required bin is full exposing drills above the top of the bin. This prevention may be done by an optical sensor such as a camera 160 on the robot arm. If a bin is not present or if it is full, an audio alarm is signalled and the system is then transferred to a feed hold or interrupt mode. A resume control feature on the main control panel will initiate sorting once the missing bin is put into place. An error message displaying the missing bin location also appear on the control CRT 66. The camera 160 is also utilized for full bin sensing.

This optical sensing of the bins may be performed by comparing a data base element preprogrammed full in profile against the image as viewed by the robot camera. Each bin will normally appear identical to the robot as viewed by the approaching arm. If the desired bin is detected as being either missing or full, the system is transferred to an interrupt or feed hold mode signaling an audio alarm. Restarting the system once a bin has been emptied is performed in the manner as any other interrupt.

Regardless of the method utilized, checking for bin presence and full bin conditions does not extend the desired drill inspection and sorting cycle time.

When a feed hold is enacted and an audio signal fired to alert an operator, the feed hold retains the robot at the bin approach position at the end of the horizontal rotational path. This will provide an indication of which bin is to be emptied. An error message displaying the full bin also appears on the control CRT 66 and display monitor 92.

Hopper Assembly

The hopper assembly 16 includes apparatus for singly transporting a drill 28 from a supply of drills 48. The apparatus comprises a reservoir or hopper 162 for containing the supply of drills, the hopper being formed of angled floor sections 164, 166 and vertical walls 168, 170 for confining the supply of drills contained therein. This reservoir also has an elongated horizontal opening 172 in the bottom of the angled floor sections. A lifting blade 174 is positioned within the opening and has a dished upper surface capable of receiving and supporting a single drill from the supply of drills contained in the hopper or reservoir. First pneumatic drive means 176 are included to reciprocate the blade 174 vertically for lifting a single drill 28 from a lower position within the supply of drills contained in the hopper to a higher position above the supply of drills contained in the hopper. A rod-like member or pusher 180 is located axially offset from the higher position and adapted for reciprocation between a first or rest position to a second or activated position adjacent the higher position. Second pneumatic drive means 182 are included to reciprocate the rod-like member from the first position to the second position for advancing a drill from adjacent the upper position to an axially displaced final location, the ready position 50 for initial or coarse diameter inspection. A hopper controller 78 is also included to actuate the first drive means 176 and the second drive means 182 in a predetermined sequence of operations to effect the desired result.

The first drive means and second drive means are both, preferably pneumatic. Further included are conduits to couple the first drive means and the second drive means to a source of compressed aeriform fluid. The control means includes valve means to selectively activate the first drive means to move the lifting blade between the lower position and the higher position. The control means also includes a pressure regulator to apply a first predetermined pressure to continuously urge the second drive means to move the rod-like member or pusher from the first position to the second position. The second drive means is selectively activated to apply a second predetermined pressure, greater than the first predetermined pressure, to move the rod-like member from the second position to the first position by the means which selectively activates the first drive means to move the lifting blade from the higher position to the lower position. The control means is adapted to energize the valve means and the regulator in a predetermined sequence of operations wherein the lifting blade first moves to raise a drill from the lower position to the higher position, then the rod-like member moves to transport a drill from the upper surface of the lifting blade in the higher position to an axially offset, second or final ready location, and then finally the lifting blade and the rod-like member are returned to their lower and first positions, concurrently.

It is at this second, final, or ready position 50 at which the drill is inspected to set the parameters for the second or high resolution inspection. And it is from this second, final, or ready position that the gripper fingers 98, 100 grip the drill for its inspection and sorting to the appropriate bin as a function of the inspection.

The drill hopper 162 is designed to retrieve a single drill 28 as from sizes ranging from 0.098 to 0.500 inches (0.25 centimeters to 1.27 centimeters) from the hopper reservoir 162 and slide it into a final or presentation position 50, shank end first, for pick-up by the sorting manipulator gripper fingers 98, 100. The unit is electronically controlled through the hopper controller 78, functioning as part of the digital input processor 72. The blade 174 functions one complete revolution per cycle. Limit switches mounted under the hopper drill chamber control the cycle of the unit once an initiation command has been received from the hos computer or system controller 62.

The hopper requires two input/output (I.O.) type interface functions. One closes a momentary switch supplying power to the blade moving circuit, initiating a cycle. When the return limit switch is tripped, the motor power supply circuit is cut. The second I.O. transmits the limit switch closure as an end of the cycle output to the host computer.

In addition, once the cycle initiation command has been outputted, a time function is started. If the end of cycle limit switch output is not received in a pre-determined time, a hopper fault output message is displayed on the host computer CRT 66 and the printer 68. This will put the entire system into a hold condition. This diagnostic function may also be performed without a clock. This is effected by checking for an end of cycle limit switch output as the sorting manipulator fingers 98, 100 return to the home position prior to the blade moving to pick up another drill for inspection.

The hopper 162 is mounted via tapped holes 184 in the horizontal support plate 186 which makes up the base plate of the housing assembly. The tapped holes are supported in studs 188 upstanding from the upper surface of the table 156 supporting the bins for accurate positioning between the hopper, ready position and other components of the system.

It is also preferred that prior to loading drills in a hopper for feeding, inspection, and sorting that such drills be cleaned. Cleaning can be accomplished in any conventional manner as, for example, by solvent cleaning and/or ultrasonic cleaning. Such cleaning step improves the quality of inspection which is to follow and consequently, the sorting done after the inspection.

Further details of the drill hopper assembly can be had by reference to application entitled DRILL FEEDING APPARATUS, 07/069,344, filed July 2, 1987, assigned to the same assignee as the present application.

Inspection Assembly

The high speed optical inspection assembly 18 interacts with the other assemblies of the system by utilizing three cameras 54, 56, 58 and various light sources 84, 86, 88 to inspect a plurality, eleven in the disclosed preferred embodiment, of features of the drill point from three viewpoints, indexing the drill 180 degrees and verifying the symmetry by re-inspecting six features. The inspection data is compared to a master drill geometry data base organized by length, diameter and point angle to determine the actual condition and sorting location of each drill.

Inspection begins with the overhead coarse diameter camera 54 viewing the drill 28 at the ready position 50 in the hopper assembly 16. The diameter of the drill is determined by utilizing the digital input processor (DIP) 72 for comparing the digital output of the camera 54 with a reference file within the DIP 72. With the diameter of the drill 28 at the ready location determined, the drill may be transported by the robot 26 from the first inspection station 190 at the ready location 50 to a second inspection station 192 having a high resolution input camera 58 for an end view and a high resolution input camera 56 for a side view. The end view camera 58 is backed by a ring light 88 through which the drill is inserted for illumination for inspection by the end view camera. A panel light 86 on the side of the drill remote from the side view camera provides the necessary illumination for the side view camera. The second station is an inspection for wear. However, the length of the drill is also determined at the second inspection station 192 as a further input to the robot controller 74 for determining the appropriate bin in which the drill 28 is to be deposited.

The output of the coarse diameter camera 54 presets or preconditions the second inspection station 192 in that it determines the portion of the master reference data base within the DIP 72 to which the digital representation of the output of the high resolution cameras 56, 58 is to be compared. The comparison is done with the digital output of the high resolution cameras against the digital master drill reference data base of the DIP for the particular drill diameter being inspected. Latitudes in predetermined tolerances are in the DIP reference filed to allow for a minor degree of wear prior to rejection and sorting for re-grind. Such minor deviations in wear can still find the drill acceptable for return to the machine shop floor for further operation and use.

As disclosed herein, pluralities of trays or bins 30, 32, etc. are arranged for receiving drills as a function of inspected size and wear. The bins on one side of the hopper are preferably for receiving acceptable drills whereas the bins on the other side are for receiving drills to be re-ground. Consequently, a bin on each side of the bin assembly is for the same length and diameter drill, but one bin for acceptable drills, and the other for rejected drills.

To obtain a 0.001 inch (0.00254 centimeter) optical inspection resolution, each pixel of the 512×512 linear array display of the inspected drill is approximately 0.001 inch (0.00254 centimeter). Due to this high resolution requirement, full field of view for inspection is approximately 0.500 inch (1.27 centimeters)×0.500 inch (1.27 centimeters). Therefore, drill sizes from 0.098 inches (0.250 centimeters) to 0.500 inches (1.27 centimeters) may be randomly inspected and sorted by the system. In order to minimize inspection time, the coarse diameter camera 54 is mounted above the robot pick-up point or ready location 50 on the drill hopper 162. Mounted in this position, the camera provides a diameter measurement of the drill shank to the host controller 62 so that a power zoom lens 60 on the point view camera can be adjusted for optimum field of view and accuracy prior to the drill arriving at the second inspection station 192.

Figure 7A:
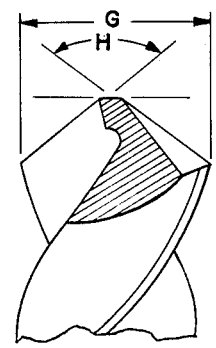
FIGS. 7A, 7B, and 7C are elevational views of a drill identifying the potential wear points thereof to be inspected.
Figure 7B:
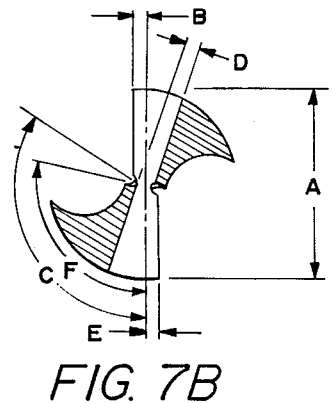
Figure 7C:
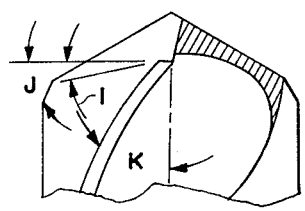
Figure 5:
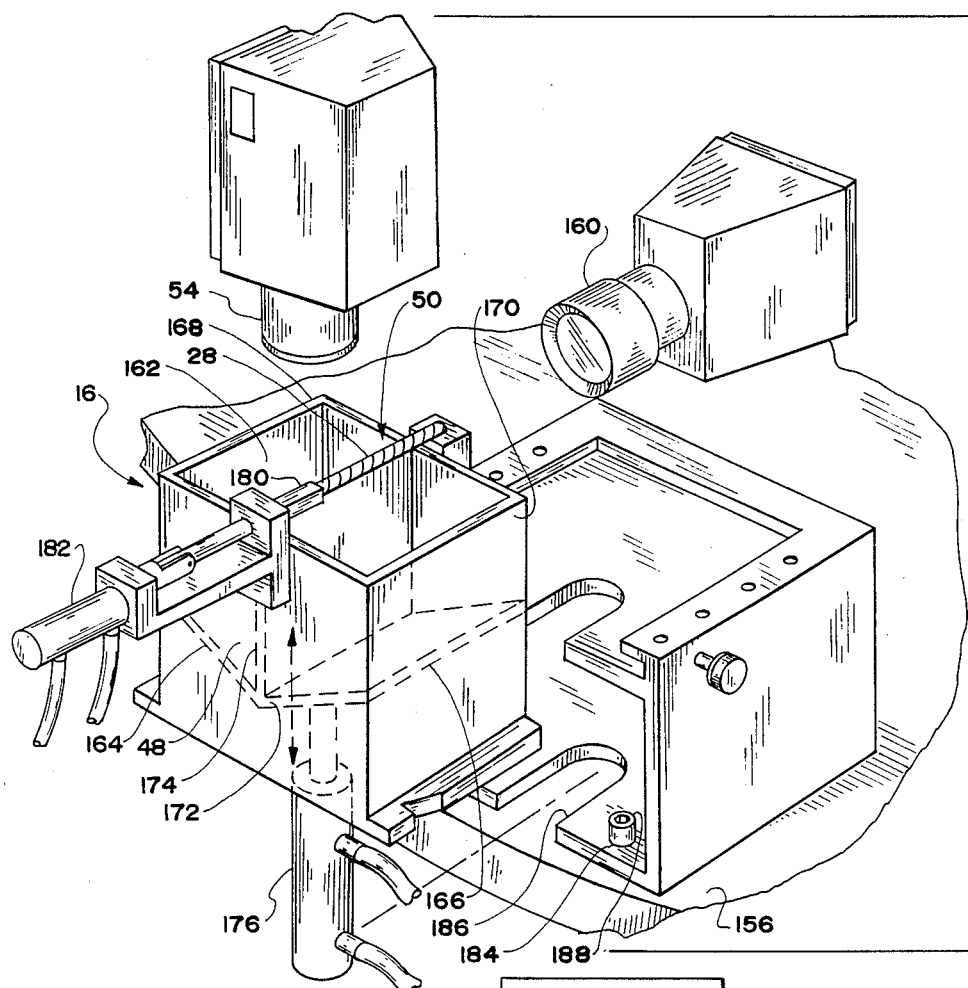
FIG. 5 is a perspective exploded illustration of the hopper assembly and the first inspecting station as shown in FIG. 1.
Figure 8:
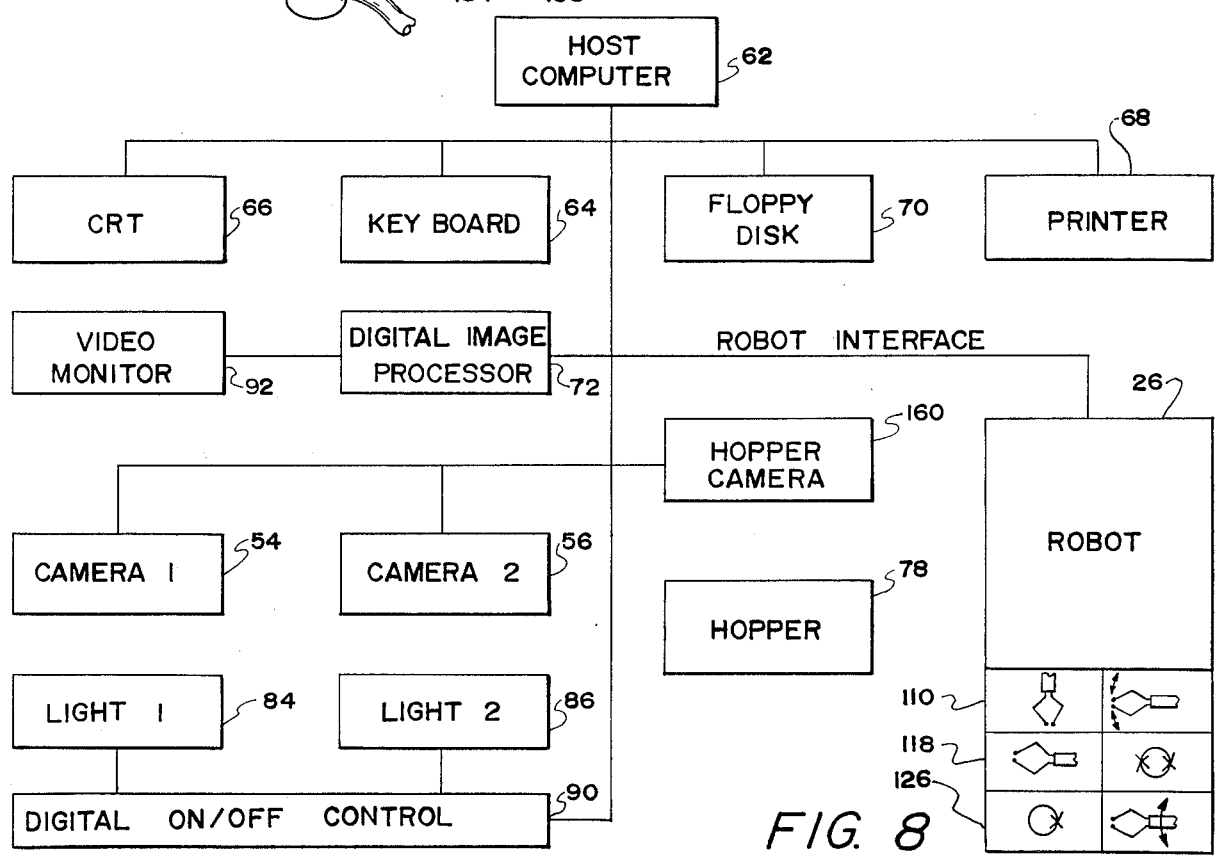
FIG. 8 is a schematic of the control assembly

FIGS. 7A through 7C display the functional requirements for drills. All eleven features must be measured to tolerances. These features are: (A) Diameter, end view;

(B) Wearland; (C) Chisel angle; (D) Web thickness; (E) Margin width; (F) Secondary cutting angle; (G) Diameter, side view; (H) Point angle; (I) Primary clearance; (J) Split clearance; and (K) Helix angle. Following analysis of these eleven features, the drill will be indexed 180 degrees. To verify the drill point symmetry, chisel angle, web thickness, margin width, secondary cutting angle, primary clearance and wearland will be re-inspected. If symmetry of these features is not within an established, software adjustable, tolerance, the drill will be rejected and sorted for re-grinding.

Drill inspection data in digital form from the inspection cameras will be compared to a drill geometry data base organized by drill length, diameter and point angle. A software feature for adding additional discriminators may be provided. As each feature is determined, it is to be matched to the corresponding data base mate dimension and associated predetermined tolerance spread. If any feature deviates beyond the tolerance band, the inspection cycle is halted and the drill sorted to a regrind bin by diameter, point angle and length. If all features are within tolerance including wearland and symmetry, the drill will be sorted to a "return to production" bin by size, point angle and length.

Cycle time requirements for the complete drill inspection and sorting operation, in the preferred embodiment, is not to exceed a 15 second per drill average over a four-hour period. Due to the "real time" nature, the inspected image is stored in buffer storage for processing. The actual inspection cycle is anticipated to be approximately 3 to 5 seconds per drill.

The digital image processer (DIP) 72 is responsible for all optical inspection tasks. The DIP is interfaced to the host controller computer 62, cameras 54, 56, 58, lights 84, 86, 88, lighting controls 90, and display monitor 92. The features to be included in the DIP are: (1) 256 Gray scale digital image processing capable of performing image subtraction, convolutions, 2-dimensional digital filtering, and buffering up to three 512×512 images with input/output image transformation; (2) an INTEL 8086 16-bit microprocessor with 8087 math co-processor; (3) Window and crosshair data selection/extraction; (4) Image filtering; (5) Least squares fit of video data to lines, arcs and circles; (6) Compass gradient processing module for drill orientation; (7) Center line view penetration sensing module for drill length determination; (8) Lighting system control; (9) Rugged, sealed component packaging; (10) Interfacing capability; (11) 0.001/pixel resolution, approximate; and (12) Interface compatability with the host computer.

A low-cost/resolution camera 54 is placed directly above the drill hopper pick-up or ready position 50 to determine the diameter of randomly hoppered drills. The output of the camera provides a means to energize the power zoom lens 60 feature on the end point view camera 58 prior to the drill reaching the second inspection station 192. This camera will not provide diameter inspection values; therefore, coarser accuracies are sufficient. Utilizing the power zoom lens feature to provide full frame viewing for each drill size optimizes inspection system accuracy.

The camera views and transmits the drill diameter immediately after each drill is fed into the ready position by the hopper. The power zoom lens cycle is initiated for the upcoming drill immediately following inspection of the previous drill. Sequenced in this manner, the power zoom lens cycle will be completed as the sorting robot 26 returns to retrieve the drill from the hopper ready location 50.

In order to aid in drill classification, the drill inspection and sorting system also provides a coarse, drill length measurement. This capability is achieved utilizing this or a similar methodology and components.

The robot 26 retrieves a drill 28 from the hopper 162 and rotates it to the inspection point centerline, on center with the point view camera 58, and feeds forward towards the inspection point under "search command" control. The "search command" basically initiates a feed movement which continues until a "halt" input is received as an I/O command. The "halt" command I/O will be outputted to the robot from the host computer 62 and/or DIP 72 as the drill point reaches the centerline of the side view camera 56. A deceleration function is required to provide optimum speed. Once the "halt" command has been received by the robot 26, the forward travel is stopped and the position of the robot head centerpoint compared to a calibrated scale, data base element, providing drill length. The length value is paired with the precision diameter and point angle values to identify the correct data base master dimension file element for drill evaluation. In addition, the length is compared to a minimum acceptable length value for each drill size.

A software provision is included in the drill inspection system to radially orient each drill through the robot fingers 98, 100 as it is presented to the cameras. In that both inspection cameras are fixed, this radial orientation feature is linked to the gripper wrist 142 so that the drill 128 can be properly orientated with respect to both cameras 56, 58.

Four cameras 54, 56, 58, 160 are utilized in the drill inspection and sorting system 10. Two 56, 58 are used to provide various views for prevision optical inspection. The first camera 54 is used for coarse drill diameter evaluation. The fourth camera 160 is fixed to the robot arm 112 and utilized for "full bin" and "bin presence" evaluation. The two precision inspection cameras are preferably of the 500×4000 Dage/MTI instrument grade Newvicon type capable of providing +/−0.0005 inch (0.00127 centimeters) inspection accuracy. The coarse diameter camera is free; however, diameter determination accuracy to +/−0.003 inch (0.0762 centimeters) must be obtainable. The bin condition and presence sensing camera type is also free due to its minimum accuracy application. All cameras are preferably ruggedly packaged and non-vibration-sensitive. The "bind condition and presence" camera is compatible with constant high inertia motions of the robot arm.

The end point view camera 58 is equipped with a DIP/host computer 62 controllable power zoom lens 60. The zoom lens/lens combination provides a full frame view of drills ranging from 0.098 inch (0.252 centimeters) to 0.500 inch (1.27 centimeters). Speed of the zoom lens unit does extend the desired 15 second inspection and sorting cycle.

As shown in FIG. 1 the inspection assembly 18 is mounted on a cubical riser 194 fixed to the sorting tower support table 156. Each camera is mounted to a rigid tubular mount with large surface mounting plates. Vibration dampening must be a major priority in mounting design.

Camera-to-mount attachment provides a means to adjust the camera position but assure positive hold down once the camera is located. All electrical/video connections to each camera run inside of a camera mounting tube. Grommets are installed where wires leave the tubes to connect to each camera.

The DIP 72 is responsible for integrated control of the ring 88, back 86 and spot 84 lights used to illuminate various facets of the drill during inspection.

A ring light 88 is utilized to illuminate the drill point area for point end view inspection. The ring light is mounted in a similar manner utilized for camera mounting. The ring light position is fixed and does not require relocation for different drill lengths. If a fluorescent light is used, the right light cycle are initiated prior to drill presentation to the inspection point to prevent inspection cycle delays. Power controls and supplies for the ring light are mounted in the support table cabinet. A provision is made for simple bulb changing.

Back lights are used for the side view and coarse diameter camera as required as shown in FIG. 1. All back lights are of sturdy construction with sealed enclosures. The coarse diameter lights are mounted to the inspection system riser with shock mounts. The side view light 86 is mounted to a rigid upright via shock mounts. Power controls and supplies for the back lights ar mounted in the support table cabinet. A provision is made for simple bulb changing.

Exact location and number of spot lights 84 are determined by actual testing of the drill inspection system. As with the right and back lights, all units are rigid, sealed, and mounted via shock mounts. Power control and supply and bulb changing simplicity is desired.

The drill inspection and sorting system 10 requires a minimum of operator controllable functions. The following controls should be provided, clearly labelled, adjacent to the control CRT 66 and video inspection monitor 92 on the free standing control console: (1) Emergency stop palm button. Robot and hopper shutdown only, not the host controller. Start-up requires re-homing robot, and the like from locked control cabinet; (2) System enable ket switch: Allows system start-up by authorized personnel, i.e., power up/off; (3) Cycle start/resume, one or two button: Start complete system cycle; (4) Interrupt, i.e., feed hold condition: Eliminates cycle start/resume and holds all system functions. Resume will provide continued process sequencing; (5) Cycle Stop: Allows cycle in progress to be completed returning robot, gripper empty, to home position; and (6) Fault condition indicator: Status indicators are provided for each mode of operation. Lighted switches may be used. All controls are NEMA 23 sealed type. Any fault condition which provides a CRT display initiates an interrupt command. A resume function may not be initiated until the fault, i.e., full bin, no bin or malfunction, has been corrected.

A 12 inch (30.48 centimeter) diagonal minimum video inspection monitor 92 is mounted on the free standing control console. The monitor provides picture quality controls accessible to the operator. The monitor displays the real time, multi-camera inspection process with cursers highlighting the process.

While extensive control system diagnostics are defined, hereinafter, the DIP 72 also provides a means to monitor its own performance and the performance of components under its control, i.e., cameras 54, 56, 58, 160, power zoom lens 88 and lighting assembly 90. Diagnostic features monitoring the following functions are provided as follows: (1) Camera condition: Presence of power and/or illuminescence, i.e., bulb is functioning; (2) DIP Condition: Communications link function, signal processing function, multi-processor functioning and lighting control switching and (3) Power zoom lens, Non-response to zoom lens commands.

Failure of any of these elements provides a control system CRT error message identifying the system and unit in fault and put the drill inspection and sorting system in a feed hold mode. Elimination or repair of the faulty element and initiation of a fault recheck, i.e., keyboard entry to a re-examine fault condition for repaired status, clears the fault. The resume control re-activates the inspection and sorting cycle.

The drill sorting mechanisms, i.e., robot assembly 12, bin assembly 14 and hopper assembly 16, interact with the optical drill inspection assembly 18 by receiving drills from the drill hopper, presenting the drill 28 to the cameras 54, 56, 58 while determining drill wear and size and then depositing each inspected drill into the appropriate sorting bin 30, 32, etc. by point angle, size and length. Physical components in the drill manipulator, fingers 98, 110, robot controller 74, teach pendant, sorting bins 30, 32, etc., tower structure 144, and host controller interface 64.

Control Assembly

The control assembly 22 is responsible for integration of the various controllers in the system (DIP/robot), data base management, sequential function initiation, drill condition/sorting location determination, operating status tracking, and diagnostic management. The host computer is also responsible for control of all peripheral devices: CRT 66, keyboard 64, floppy disk drive 70, printer 68 and necessary I.O.'s 68, etc.

For the purposes of this application, the control assembly might be considered as all elements, sub-assemblies, and assemblies through which the electrical and mechanical components operate. It is understood, however, the various segments of the control assembly 22 have been described hereinabove to a limited extent in association with the descriptions of the various assemblies, other than the control assembly.

The workstation controller is preferably a Hewlett Packard Model 9920S development system. The following components are included in the system. Each component is interfaced as an address: (1) Host Computer 62: A "box" host computer is used as a workstation controller due to its processing speed and ample card slot space. The unit is preferably 16 bit with 32 bit internal architecture based on the Motorola MC6800 microprocessor. A composite video card set is also used. The unit has approximately 640K ram. The computer is mounted in the control console; (2) Keyboard 64: A keyboard is used with a 2B keyboard upgrade. The keyboard is installed waist high, on a pull-out, locking shelf in the control console; (3) Display 66: A 12-inch (30.48 centimeter) CRT display with 300×400 resolution is used for system status output. The CRT is mounted alongside the video monitor in the control panel; (4) Disk Drive 70: A dual 3.5 inch (8.89 centimeter) floppy disk drive is used. Each drive may store up to 270K. The drive is mounted in the control console; (5) Printer 68: A serial impact printer providing up to 160 characters/second and a 2K buffer is provided. The buffer allows downloading of print data without delaying the inspection process. Interface with the host compute is via a Hewlitt Packard I.B./parallel port; and (6) Both BASIC and PASCAL can be used with the system. PASCAL is referred due to its power, speed and improved structuring.

A variety of data bases are established for comparison of optically inspected drill geometry-condition, a full sorting bin optical profile and drill length determination calibration values.

Each optically inspected drill 28 is compared against a master drill geometry file indexed by drill diameter, length, and point angle. A tolerance is also included for each geometry feature including wearland. Organized in this fashion, the coarse drill diameter and drill length determination, preparatory to the precision inspection steps, can be used to locate the correct file for comparison of precision values prior to the actual inspection process. A modular software structure is adopted to allow future additional qualifiers in addition to drill diameter, length and point angle.

Figure 6A:
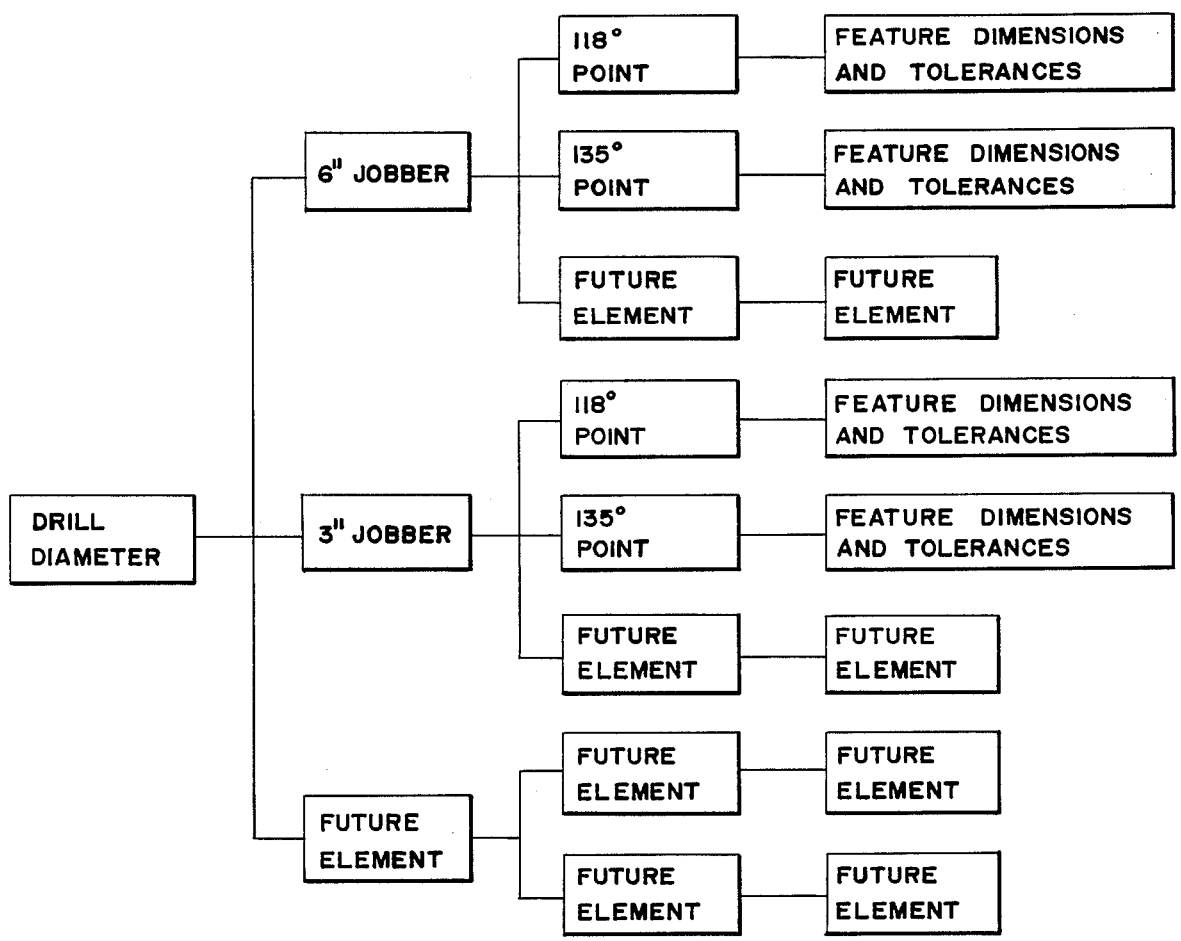
FIG. 6A is a block diagram of the generic structure of a drill specification data base used in the present invention.

The data base generic structure is as shown in FIG. 6A.

Figure 6B:
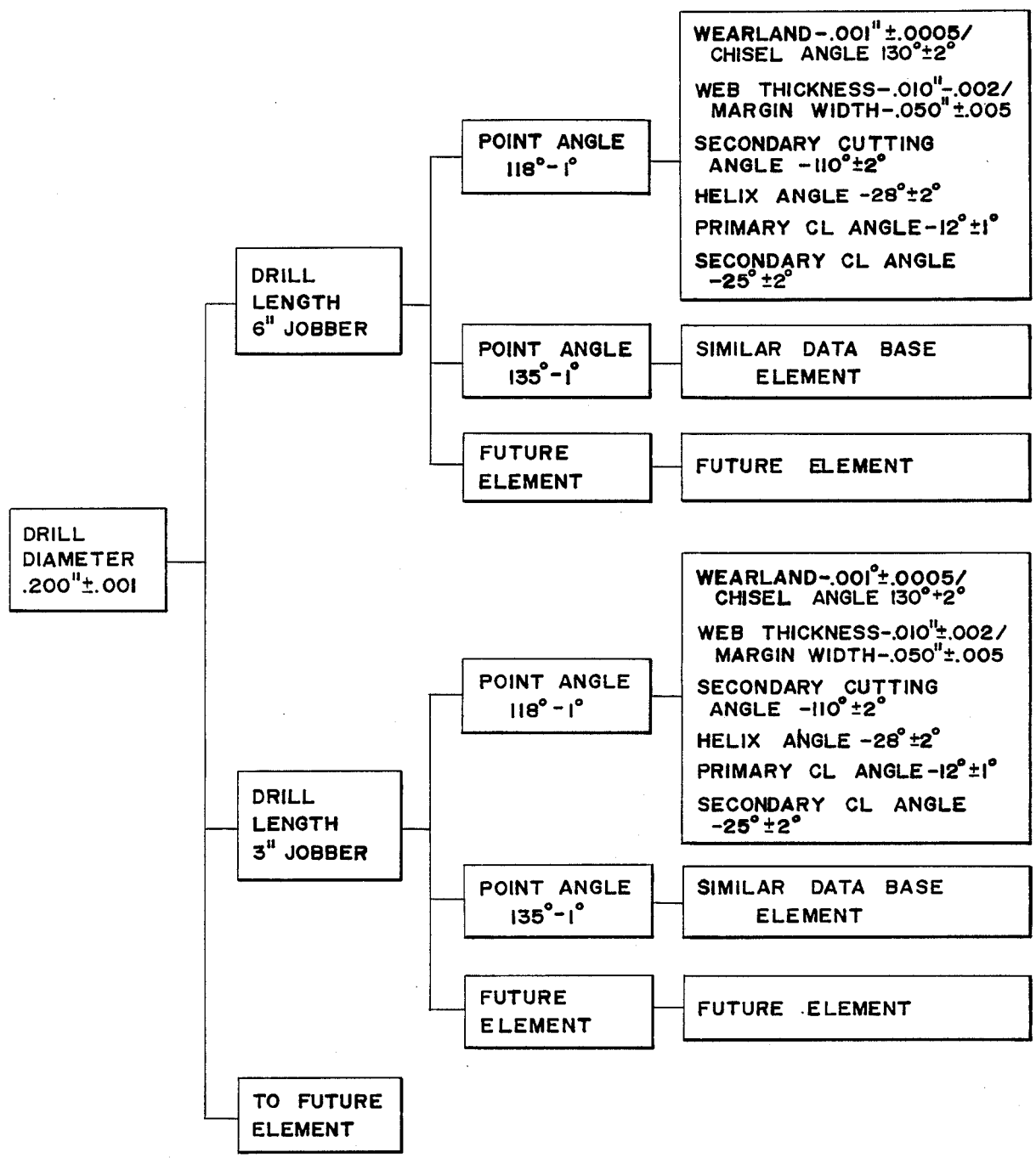
FIG. 6B is an example drill data element showing particular drill data for use in the data base of FIG. 6A.

The dimensions and tolerances portion of each drill's data element should appear as in the following example as shown in FIG. 6B.

Exact structure is free; however, all above listed items are included for each diameter, length and point angle. The data base is sized to accommodate a minimum of 50 different drill sizes with a minimum of two length and point angle qualifers for each. As previously mentioned, space or a modular structure is incorporated to allow additional drill point and/or length qualifiers in the future.

Since a robot arm mounted camera is used to sense for a full bin condition, an "optical full bin profile" is included as a data base element.

The position of the center point of the robot arm 112, grippers 98, 100 in vertical position, is used to determine drill length as the drill is moved to the second inspection station. Robot location values are oriented from a predetermined point on the horizontal stroke or from the centerline of the robot. Actual calibration values are established during system set-up.

An interface is provided between the workstation host computer 62 and sorting manipulator fingers 98, 100 to provide high speed drill sorting, approximately 5–7 seconds. It is anticipated that this interface is structured by storing bin and positional data points in the robot controller. A variation of the palleting programming approach could be utilized. The host computer 62 provides initiation commands to begin an inspection or sorting motion program. In general, the following interface capabilities are provided: (1) Host computer initiation of motion sequences; (2) DIP/host computer interface for drill length determination, i.e. search command and positional output; (3) Full bin and bin presence sensing; (4) Diagnostic outputs; (5) Reset functions, return to home; (6) Mechanical drill hopper interface; and (7) DIP/host computer interface for radial drill orientation.

In a production environment, it may be desirable or necessary to provide a calibration program for daily checkout of the manipulator. If system testing shows a need for such a routine, it can be incorporated with a daily system start-up function eliminating operator operation of the manipulator through the teach pendant. The routine is preferably run automatically when the system start operator control is depressed at the start of each day or after a down time period. The routine is not to be automatically initiated following an interrupt.

The host compute 62 provides a running log of the drill inspection and sorting system activities. The log includes individual, sequential, data elements displaying the results of each inspection cycle, fault condition or downtime. A summation printout via the printer 68 is available on request which includes a time stamp.

The running status display provides for each cycle as a minimum: a time function, drill qualifier, i.e. diameter, length and point angle, and the inspection determination. If the drill is rejected, thus requiring grinding, the discrepant dimensional feature is included.

If a feed hold fault condition, or downtime period is incurred, a log entry with a time stamp is included.

On request by a key switch command, a printout of the day's activities is provided via the printer 68. The printout may be provided as a running log output as displayed on the CRT 66 if desired. If a running log printout approach is utilized, it will not inhibit printer usage for other functions, i.e. fault diagnostic aids or the like.

Required diagnostics for the digital image processor 72 inspection assembly 18, have been detailed hereinabove. The host computer workstation controller shall provide the following diagnostic capabilities: (1) Monitor controller temperature shutting off and providing a CRT display and printout prior to shutdown; (2) Provide control program functional, sequential, diagnostics and provide CRT display and printout of error status; (3) interface with the DIP for fault condition display of imaging system faults; (4)0 Provide data base related diagnostics, i.e. receipt of coarse diameter length values, no element found, etc; (5) Interface with the robot for fault condition display; (6) Interface with the drill hopper for fault condition display; (7) Prevent system start-up unless fault has been corrected; (8) Interface with the "bin presence" and "full bin provision" detection systems; (9) Provide "back door" to diagnostics program to allow programmer override of any fault; and (10) Provide a CRT display and printout error status if more than a predetermined number, as for example 20 drills, are rejected consecutively.

Any system fault puts the feed hold or interrupt mode into control and also provides a CRT 66 display and printout via printer 68 with a time stamp and provides operator information on what should be done. The operator instructions are listed hereinbelow for particular error types, with fault type control status and corrective action noted in parentheses: (1) DIP output-software fault or consecutive rejection error interrupt (consult maintenance or programmer); (2) DP output-hardware fault, component identification interrupt (check camera/component connections and bulbs or call maintenance); (3) Power zoom lens interrupt (check connections or call maintenance); (4) Control temperature overtemp/system shutdown (change air intake filter or call maintenance); (5) Host computer output software/interrupt (reset and try again); (6) Host computer output-data base/interrupt (reset and try again); (7) Robot output-hardware fault-component identification-/interrupt (check connections, gripper fingers, and arm for jamming or call maintenance); (8) Robot output-control output/interrupt (consult maintenance or programmer); (9) Drill hopper output/interrupt (clear jammed drill); (10) Drill bin presence output-no bin/interrupt (load bin in location specified); (11) Drill bin-full output/interrupt (change bins in location specified); (12) Electrical power output (auto switch to battery back-up)/shutdown (call maintenance; and (13) Pneumatic supply output-low pressure/interrupt (check supply line or call maintenance.

Each fault condition holds the system in interrupt, except for loss of power or overheating and clears by either typing in a comment to the running log as to the correction, but this is only required where the programmer or maintenance must be called or by resetting the system. Resetting the system will move the robot arm 112 to the home position opening the gripper fingers 98, 100, feeding a fresh drill 28 to the ready location 50, determining coarse diameter of the drill, setting the power zoom lens 60, and initiating a fresh sequence.

Method

The present invention also includes the method of feeding, inspecting, and sorting drills 28 from a supply of unsorted drills 48. In carrying out the method, a robot 26 is positioned with respect to a horizontal work plane 134 with a center point located at a predetermined reference location. The robot has an arm 112 rotatable with respect to a vertical axis 122 extending through the center point of the work plane 134. The arm has gripper fingers 98, 100 on the end of the arm remote from said axis. A plurality of bins 30, 32, etc. are positioned in an arcuate array with respect to the axis and the plane. Operatively positioned adjacent the robot and the bins is a drill hopper 162 having a supply of drills 48 to be inspected and sorted. Drills are fed from the hopper, one at a time, to sequentially position each drill at a predetermine ready position 50 with respect to the work plane and the axis for inspection and transportation to a particular one of the plurality of bins. The positioned drill 28 is inspected and the robot 26 is programmed for transporting the inspected drill to a particular one of the plurality of bins as a function of the inspection. Thereafter, each inspected drill is transported by the fingers 98, 100 of the robot to the particular one of the plurality of bins as a functioning of the programming.

At the beginning of any cycle as well as at start up, the fingers 98, 100 of the robot 26 are at a ready position adjacent the ready or final position of the drill to be inspected at the final or ready position of the drill hopper. The ready position of the fingers is such as not to preclude the coarse diameter camera 54 from viewing and inspecting the drill. After this inspection for diameter at the first inspection station 190, the appropriate data base file for the second inspection station 192 is selected as a function of the first inspection. The robot arm 112 is then moved rotationally, horizontally and vertically and by its appropriate drive means 110, 118, 126 in accordance with the program within the robot controller 74. The fingers 98, 100 also move from their releasing orientation to their grasping orientation to grasp the inspected drill adjacent the shank end.

The determination of diameter at the first inspection station also functions to drive the zoom lens 60 to the proper position for accurate focusing since proper focusing must be accommodated to the distance between the drill point and the end view camera 58 which will vary as a function of the drill length for each drill to be inspected.

The robot arm is again moved by its appropriate drive means in accordance with the program within the robot controller to lift the drill from the first inspection station 190; to withdraw the drill inwardly to clear the hopper assembly 16; to rotate the arm, fingers and drill towards the second inspection station 192; and then to extend the arm, fingers and drill towards the second inspection station. The extending of the robot arm causes the drill to move through the ring light 88 for proper illumination during inspection of the drill. At the second inspection station 192, the side view high resolution camera 56 makes an initial inspection of the drill then causes the robot drive means to rotate the wrist 142 coupling the fingers to the robot arm to rotate the drill into the proper orientation for the final inspection.

The drill is then inspected at the second inspection station for length and war by the two high resolution cameras 56, 58. The program for inspection for length takes into account that portion of the drill at its shank end which is obscured by the fingers 98, 100. This distance is the same for all drills regardless of size. The high resolution cameras 56, 58 inspect for a variety of wear factors as described above and digitally compare the detected observations against the reference data base values in the digital input processor 72, the proper data base values having been selected by the results of the inspection by the coarse diameter camera 54.

The inspected drill 28 is then transported to an appropriate bin for continued use or for re-grind depending on whether or not the second inspection has found the drill to be within the preset acceptable parameters for that particular size of drill. The particular bin is also to correspond to the size of the inspected drill. The robot arm 112 is again moved by its appropriate drive means in accordance with the program within the digital input processor 72 as a function of the inspection and the robot controller 74 to withdraw the drill inwardly to clear the ring light 88 and second inspection station 192; to move the arm 112, fingers 98, 100 and drill 28 toward the appropriate bin as determined by the inspection; and then to extend the arm 112, fingers 98, 100 and drill 28 to the space immediately above the appropriate bin as sown in FIG. 4. The fingers 98, 100 are then driven to the releasing orientation to drop the drill in the appropriate bind. The fingers 98, 100 and robot arm 112 are then withdrawn to their retracted position, and the robot drive means return the fingers 98, 100 to their ready position adjacent the hopper 162 to begin a next cycle of operation of drill feeding, inspecting, and sorting in a continuing cycle of operation.

As can be understood, the inspecting is accomplished optically. The optical inspecting includes visual inspection with a first camera 54 to determine the diameter of the drill 28 followed by visual inspection with the two high resolution cameras 56, 58 at a second station 192 to determine the wear and length of the drill. The visual inspection at the first station 190 establishes parameters for the visual inspection by the high resolution cameras 56, 58 at the second inspection station 192. The second visual inspection establishes the parameters for the robot 26 for the transporting of the drill 28 to a predetermined bin as a function of the established parameters for the robot 26 which are the results of the digital comparisons resulting from the inspections. The bins 30, 32, etc. are positioned in an arcuate array around the vertical axis 122 while the transporting is effected through a robot 26 with universally movable fingers 98, 100 supported on an arm 112 of the robot 26, the arm 112 being movable in an arc around the vertical axis 122 as well as horizontally and vertically.

The present disclosure includes that information contained in the appended claims as well as that in the foregoing description. Although the invention has been described in its preferred form or embodiment with a certain degree of particularity, it is understood that the present disclosure of the preferred forms has been made only by way of example and that numerous changes in the details of construction, fabrication and use, including the combination and arrangement of parts and steps, may be resorted to without departing from the spirit and scope of the appended claims.

What is claimed is:

1. A method of inspecting and sorting drills from a supply of drills comprising the steps of:

operatively positioning a robot with respect to a horizontal work plane with a center point located at a predetermined reference location, said robot having an arm moveable with respect to a vertical axis extending through said center point of said work plane, said arm having gripper fingers on the end thereof remote from said axis;

operatively positioning a plurality of bins in an array with respect to said axis and said plane;

operatively positioning a supply of drills to be inspected and sorted in a drill hopper adjacent said robot and said bins;

feeding drills from said hopper, one at a time, to sequentially position each drill at a predetermined position with respect to said work plane and said axis for inspection and transportation to a particular one of said plurality of bins;

inspecting the positioned drill and programming said robot for transporting the inspected drill to a particular one of said plurality of bins as a function of the inspection; and transporting the inspected drill by said fingers of said robot to the particular one of said plurality of bins as a function of the programming.

2. The method as set forth in claim 1 wherein said inspecting is accomplished optically.

3. The method as set forth in claim 2 wherein said optical inspecting includes visual inspection with a first camera to determine the size of the drill followed by visual inspection at a second station to determine the wear of the drill.

4. The method as set forth in claim 3 wherein the first visual inspection establishes the parameters for the second visual inspection.

5. The method as set forth in claim 4 wherein the second visual inspection establishes the parameters for the robot for the transporting of the drill to a predetermined bin as a function of the established parameters of the robot.

6. The method as set forth in claim 5 wherein said bins are positioned in an arcuate array around said vertical axis and said transporting is effected through said fingers of said robot moving in an arc around said vertical axis.

7. Apparatus for inspecting and sorting cylindrical objects, one at a time, from a supply of cylindrical objects comprising:

a horizontal work plane with a center point located at a predetermined reference location;

a robot operatively positioned with respect to said work plane, said robot having an arm rotatable about a vertical axis extending through said center point of said work surface, said arm having gripper fingers on the end thereof remote from said axis;

a drive assembly having a first drive means to rotate said fingers about said axis, a second drive means to raise and lower said fingers with respect to said axis, a third drive means to oscillate said fingers of said arm inwardly and outwardly along a radius extending through said axis, fourth drive means to move said fingers with respect to said arm, and fifth drive means to activate and inactivate said fingers between an object gripping orientation and an object releasing orientation;

a plurality of bins operatively positioned in a plurality of planes perpendicular with respect to said axis and at a plurality of distances from said work plane, said bins also being operatively positioned arcuately around said axis;

a hopper adapted to receive and support a supply of cylindrical objects to be fed, inspected and sorted, means associated with said hopper to feed cylindrical objects from said hopper, one at a time, and to sequentially position each cylindrical object at a predetermined position with respect to said work plane and said axis for inspection and transportation to a particular one of said plurality of bins;

inspection means positioned in operative proximity to said predetermined position to inspect the positioned cylindrical object and to program said drive assembly for transporting the inspected cylindrical object to a particular one of said plurality of bins as a function of the inspection; and means responsive to the inspection of each cylindrical object and the programming of said drive assembly to activate said drive assembly for transporting the inspected cylindrical object by said fingers to the particular one of said plurality of bins.

8. The apparatus as set forth in claim 7 wherein said inspection means includes a first sensor means for determining the size of the inspected cylindrical object and a second sensor means for determining the wear on the inspected cylindrical object.

9. The apparatus as set forth in claim 8 wherein the first sensor means preconditions the second sensor means.

10. The apparatus as set forth in claim 9 and further including a third sensor means to sense the condition of a bin prior to depositing a transported cylindrical object into the sensed bin.

11. The apparatus as set forth in claim 10 wherein the third inspection means will inactivate the drive assembly if the sensed bin is absent or full.

12. A system for feeding, inspecting and sorting drills from a supply of drills comprising:

a work plane with a center point located at a predetermined reference location;

a robot operatively positioned with respect to said work plane, said robot assembly having an arm movable with respect to an axis extending perpendicularly through said center point of said work plane, said arm having gripper fingers on the end thereof remote from said axis;

a drive assembly having means to move said fingers circumferentially with respect to said axis and to move said fingers parallel with respect to said axis and to oscillate said fingers inwardly and outwardly along a radius extending through said axis and to move said fingers with respect to said arm and to activate and inactivate said fingers between a gripping orientation and a releasing orientation;

a plurality of bins operatively positioned with respect to said robot and said axis, said bins also being operatively positioned in a plurality of planes perpendicular with respect to said axis and at a plurality of distances from said work plane;

a drill hopper operatively positioned with respect to said robot and said bins and adapted to receive and support a supply of drills to be fed, inspected and sorted, said hopper including means to feed drills from said hopper, one at a time, and to sequentially position each drill at a predetermined position with respect to said work plane and said axis for inspection and transportation to a particular one of said plurality of bins;

visual inspection means positioned in operative proximity to said predetermined position to inspect the positioned drill and to program said drive assembly for transporting the inspected drill to a particular one of said plurality of bins as a function of the inspection; and means responsive to the inspection of each drill and the programming of said drive assembly to activate said drive assembly for transporting the inspected drill by said fingers to the particular one of said plurality of bins.

13. The system as set forth in claim 12 and further including digital control means operatively associated with said visual inspection means for comparing of the output of the visual inspection means resulting from the inspection of the positioned drill against a predetermined standard.

14. The system as set forth in claim 13 wherein said visual inspection means includes a first sensor means to determine the size of the positioned drill and a second sensor means programmed in response to the output of said first sensor means to determine the wear on the positioned drill.

15. The system as set forth in claim 14 wherein the positioned drill is inspected for a first time by said second sensor means, then rotated upon its axis 180 degrees by said fingers, and then inspected a second time.

16. The system as set forth in claim 14 wherein sad second sensor means inspects for a plurality of wear factors.

17. The system as set forth in claim 16 wherein the output of the second sensor means determines the acceptability or rejectability of a drill as a result of the comparison and then said fingers transport the inspected drill to a bin as a function of the acceptability or rejectability as well as the size thereof.

18. The system as set forth in claim 17 and further including an optical detector associated with said arm to determine the condition of the particular one of said plurality of bins.

19. The system as set forth in claim 18 and further including means to inactivate said drive assembly if said particular one of said plurality of bins is absent or full.

20. The system as set forth in claim 14 wherein the output of said second sensor means controls said drive assembly.

* * * * *